(12) United States Patent
Barkan et al.

(10) Patent No.: US 11,119,185 B2
(45) Date of Patent: Sep. 14, 2021

(54) RESOLVING DOPPLER AMBIGUITY IN MULTI-INPUT MULTI-OUTPUT RADAR USING DIGITAL MULTIPLE PULSE REPETITION FREQUENCIES

(71) Applicant: GM Global Technology Operations LLC, Detroit, MI (US)

(72) Inventors: Gonen Barkan, Lehavim (IL); Ilya Shapir Poltorak, Rehovot (IL); Ishai Eljarat, Raanana (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 594 days.

(21) Appl. No.: 16/002,061

(22) Filed: Jun. 7, 2018

(65) Prior Publication Data

US 2019/0377062 A1    Dec. 12, 2019

(51) Int. Cl.
| | |
|---|---|
| G01S 7/295 | (2006.01) |
| G01S 13/931 | (2020.01) |
| G01S 13/58 | (2006.01) |
| G01S 7/288 | (2006.01) |

(52) U.S. Cl.
CPC ............ *G01S 7/295* (2013.01); *G01S 13/582* (2013.01); *G01S 13/931* (2013.01); *G01S 7/2883* (2021.05)

(58) Field of Classification Search
None
See application file for complete search history.

(56) References Cited

U.S. PATENT DOCUMENTS

| | | | |
|---|---|---|---|
| 9,599,702 B1* | 3/2017 | Bordes | G01S 13/18 |
| 2017/0082730 A1* | 3/2017 | Kishigami | H01Q 21/061 |
| 2018/0045819 A1* | 2/2018 | Cornic | G01S 13/36 |
| 2018/0164422 A1* | 6/2018 | Bilik | G01S 13/343 |
| 2019/0129004 A1* | 5/2019 | Jaeger | G01S 13/34 |

* cited by examiner

*Primary Examiner* — Whitney Moore
(74) *Attorney, Agent, or Firm* — Cantor Colburn LLP

(57) ABSTRACT

A system and method to detect a target with a radar system of a vehicle involve transmitting two or more chirps, in turn, from two or more transmit elements. Each chirp is a continuous wave liner frequency modulated waveform. The method also includes receiving reflections generated by each of the two or more chirps from each of the two or more transmit elements at two or more receive elements, and processing the reflections based on a Doppler sampling frequency corresponding with a period of each of the two or more chirps to determine velocity of each detected target relative to the vehicle.

14 Claims, 6 Drawing Sheets

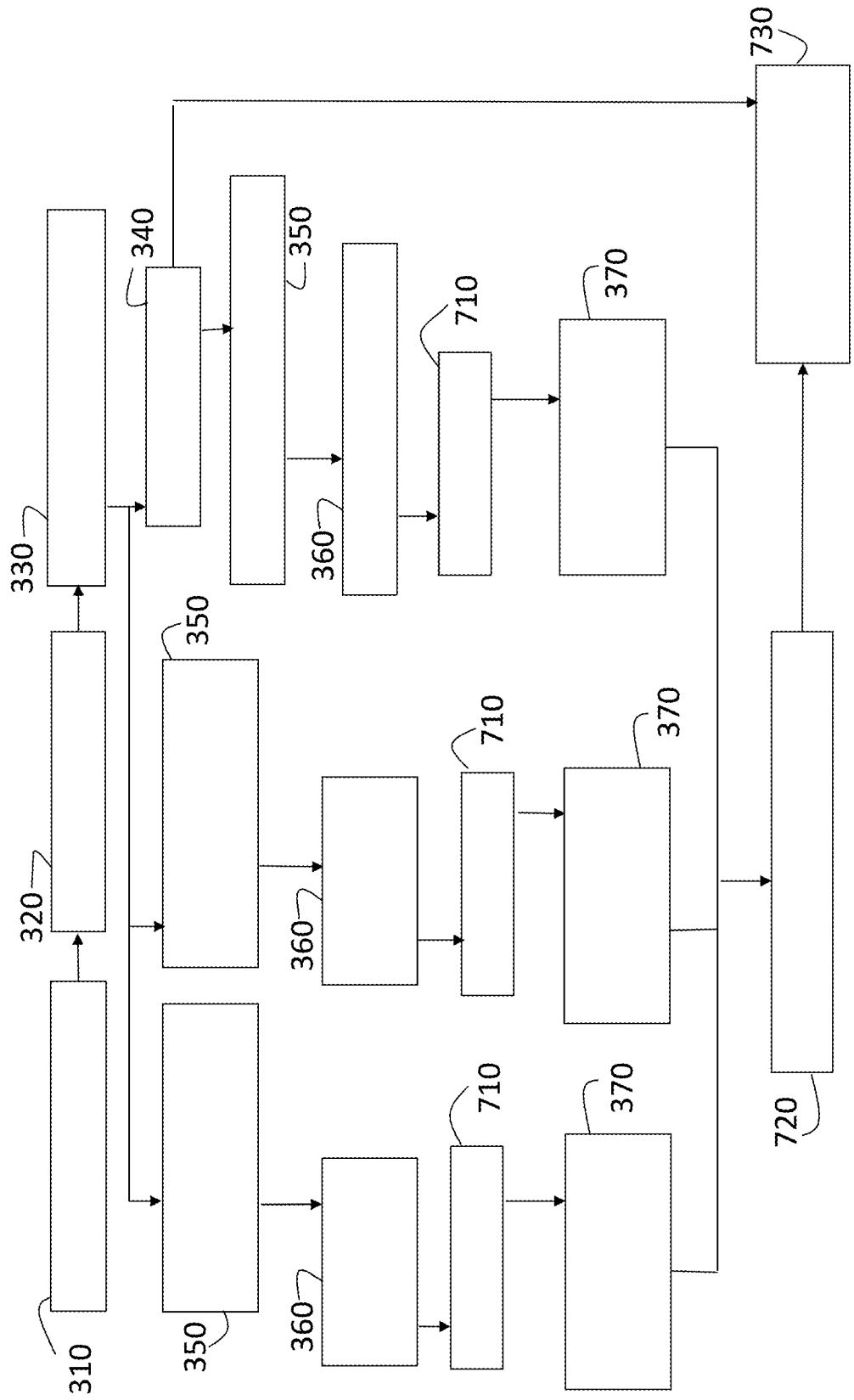

RESOLVING DOPPLER AMBIGUITY IN MULTI-INPUT MULTI-OUTPUT RADAR USING DIGITAL MULTIPLE PULSE REPETITION FREQUENCIES

INTRODUCTION

The subject disclosure relates to resolving Doppler ambiguity in multi-input multi-output (MIMO) radar using digital multiple pulse repetition frequencies (MPRFs).

Radio detection and ranging (RADAR) is used in a variety of application to detect and track objects that reflect radio frequency energy. Radar is an important component in augmenting or automating systems (e.g., braking, steering, parking, adaptive cruise control) in vehicles (e.g., automobiles, trucks, construction equipment, farm equipment, automated factory equipment). For example, autonomous driving systems rely on radar and other sensors to detect and avoid obstacles. Pulse-Doppler and modulated continuous wave radar transmits a pulse train of chirps (pulses of linearly increasing or decreasing frequency) and estimates range to a target by estimating time of flight and estimates speed of a target by estimating Doppler frequency, which corresponds to the shift in frequency between transmitted pulses and resulting reflections. The maximal unambiguous range, which is obtained by estimating range ambiguity from intra pulse processing and removing the range ambiguity by applying a low pass filter (LPF) and analog-to-digital converter (ADC), is regarded as the radar maximal range Rmax. Doppler ambiguity cannot be filtered but is generally resolved using MPRFs. However, this requires a variation in the transmitted waveform (e.g., bandwidth, slope, length of chirp) between pulses in the same pulse train or from one pulse train to the next. Further, the pulse to pulse MPRF approach, for example, assumes a constancy in the target between pulse trains that may be impractical in a vehicle context. Accordingly, it is desirable to provide an approach to resolving Doppler ambiguity in MIMO radar using digital MPRFs.

SUMMARY

In one exemplary embodiment, a method of detecting a target with a radar system of a vehicle includes transmitting two or more chirps, in turn, from two or more transmit elements. Each chirp is a continuous wave liner frequency modulated waveform. The method also includes receiving reflections generated by each of the two or more chirps from each of the two or more transmit elements at two or more receive elements, and processing the reflections based on a Doppler sampling frequency corresponding with a period of each of the two or more chirps to determine velocity of each detected target relative to the vehicle.

In addition to one or more of the features described herein, the processing the reflections includes performing a range fast Fourier transform (FFT) to obtain a range-chirp map as a matrix of FFT results for each range bin and each chirp for every combination of the two or more transmit elements and the two or more receive elements.

In addition to one or more of the features described herein, the processing the reflections further includes performing a Doppler FFT on the range-chirp maps to obtain a range-Doppler map as a matrix of FFT results for each range bin and each Doppler bin for every combination of the two or more transmit elements and the two of more receive elements.

In addition to one or more of the features described herein, the processing the reflections further includes performing target detection using the range-Doppler maps.

In addition to one or more of the features described herein, the processing the reflections further includes comparing a result of the performing the target detection with a result of performing a second Doppler FFT on the range-chirp maps, wherein the performing the second Doppler FFT involves obtaining FFT results for each range bin and each Doppler bin associated with all of the two or more transmit elements for each of the two or more receive elements.

In addition to one or more of the features described herein, the comparing is used to resolve ambiguity in the velocity of each detected target relative to the vehicle.

In addition to one or more of the features described herein, the processing the reflections further includes comparing a result of the performing the target detection with results of performing two second Doppler FFT processes on the range-chirp-maps, wherein the performing each of the second Doppler FFT processes involves obtaining FFT results for each range bin and each Doppler bin associated with all of the two or more transmit elements for each of the two or more receive elements.

In addition to one or more of the features described herein, the performing the two second Doppler FFT processes is associated with two different ranges of target velocities, and the comparing is used to resolve ambiguity in the velocity of each detected target relative to the vehicle.

In addition to one or more of the features described herein, the processing the reflections further includes performing two beamforming processes to determine corresponding directions of arrival of each target, each of the two beamforming processes being associated with a different range of target velocities.

In addition to one or more of the features described herein, the processing the reflections further includes correcting the directions of arrival to remove relative phase differences among the two or more transmit elements.

In another exemplary embodiment, a system to detect a target with a radar system of a vehicle includes two or more transmit elements to transmit two or more chirps, in turn. Each chirp is a continuous wave liner frequency modulated waveform. The system also includes two or more receive elements to receive reflections generated by each of the two or more chirps from each of the two or more transmit elements, and a processor to process the reflections based on a Doppler sampling frequency corresponding with a period of each of the two or more chirps to determine velocity of each detected target relative to the vehicle.

In addition to one or more of the features described herein, the processor performs a range fast Fourier transform (FFT) to obtain a range-chirp map as a matrix of FFT results for each range bin and each chirp for every combination of the two or more transmit elements and the two or more receive elements.

In addition to one or more of the features described herein, the processor performs a Doppler FFT on the range-chirp maps to obtain a range-Doppler map as a matrix of FFT results for each range bin and each Doppler bin for every combination of the two or more transmit elements and the two of more receive elements.

In addition to one or more of the features described herein, the processor performs target detection using the range-Doppler maps.

In addition to one or more of the features described herein, the processor obtains a comparison of a result of performing the target detection with a result of performing a second Doppler FFT on the range-chirp maps. The performing the second Doppler FFT involves obtaining FFT results for each range bin and each Doppler bin associated with all of the two or more transmit elements for each of the two or more receive elements.

In addition to one or more of the features described herein, the processor uses a result of the comparison to resolve ambiguity in the velocity of each detected target relative to the vehicle.

In addition to one or more of the features described herein, the processor obtains a comparison of a result of the performing the target detection with results of performing two second Doppler FFT processes on the range-chirp-maps. The performing each of the second Doppler FFT processes involves obtaining FFT results for each range bin and each Doppler bin associated with all of the two or more transmit elements for each of the two or more receive elements.

In addition to one or more of the features described herein, the performing the two second Doppler FFT processes is associated with two different ranges of target velocities. The processor uses a result of the comparison to resolve ambiguity in the velocity of each detected target relative to the vehicle.

In addition to one or more of the features described herein, the processor performs two beamforming processes to determine corresponding directions of arrival of each target, each of the two beamforming processes being associated with a different range of target velocities.

In addition to one or more of the features described herein, the processor corrects the directions of arrival to remove relative phase differences among the two or more transmit elements.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 7 is a process flow of a method of resolving Doppler ambiguity using digital MPRFs according to alternate one or more embodiments.

DETAILED DESCRIPTION

Figure 1:
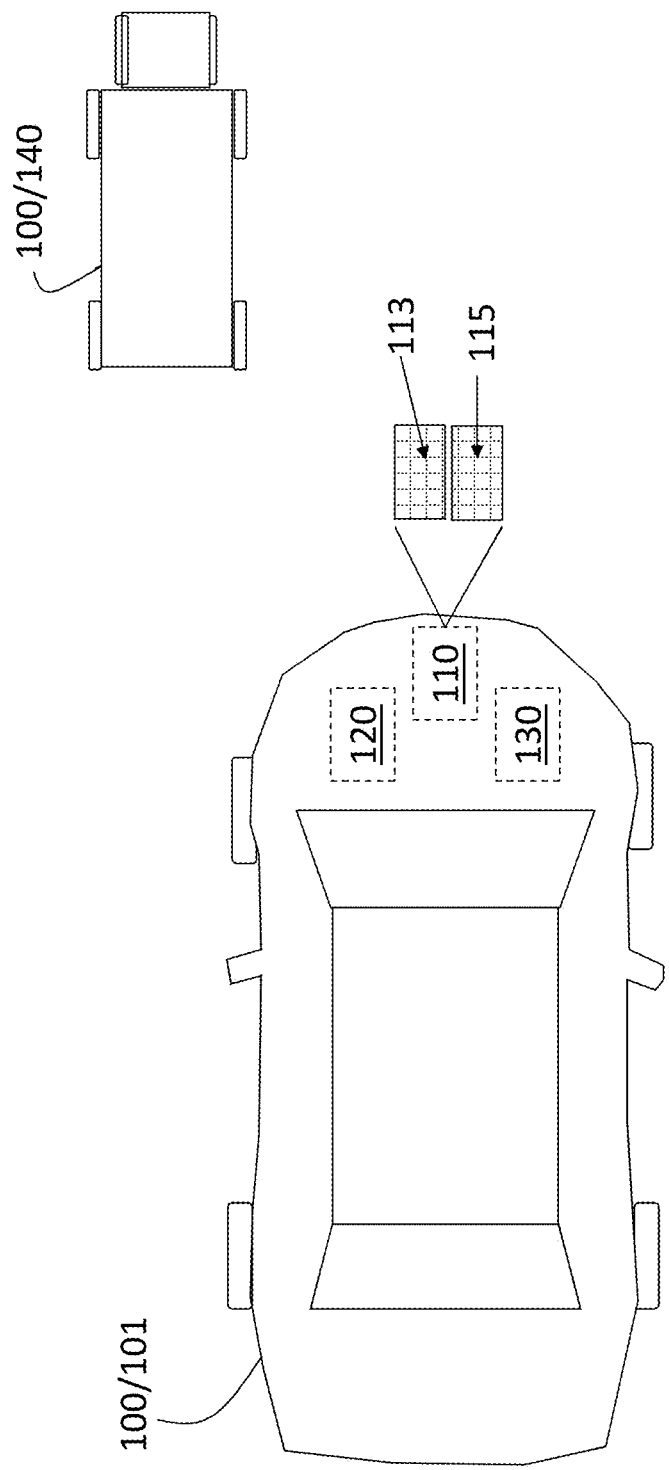
FIG. 1 is a block diagram of a radar system to resolve Doppler ambiguity using digital multiple pulse repetition frequencies (MPRFs) according to one or more embodiments.

The following description is merely exemplary in nature and is not intended to limit the present disclosure, its application or uses. It should be understood that throughout the drawings, corresponding reference numerals indicate like or corresponding parts and features.

As previously noted, sensors such as radar systems are used to augment or automate vehicle systems. A vehicle-based radar system is associated with range and Doppler ambiguity. Doppler ambiguity can affect the estimate of the direction of arrival (DOA) of the target to the vehicle. This is because Doppler estimation indicates the speed that is used to correct for phase accumulated during time differences resulting from a time divisional multiplexing access (TDMA) scheme, which creates orthogonality in time. This correction precedes joint processing on the phase across MIMO elements to estimate DOA. A prior approach to resolving Doppler ambiguity in pulse-Doppler and modulated continuous wave radar involves transmitting chirps with MPRFs. For example, reducing the pulse repetition frequency increases the effective sampling frequency. However, this approach is based on varying the transmitted waveform between pulse trains and requires an assumption that the target position does not change much between consecutive pulse trains. This assumption may not hold up in the vehicle scenario due to the challenge of associating targets between different frames and sets limitations on the radar detection latency.

Embodiments of the systems and methods detailed herein relate to creating MPRFs without changing the waveform. That is, the MPRFs are digitally generated on the receive side rather than by changing transmitted signals. Specifically, a continuous wave linear frequency modulation (CW-LFM) waveform is used and Doppler ambiguity is resolved based on signal processing of the received reflections rather than by changes to the transmitted waveforms. A Doppler fast Fourier Transform (FFT) is performed for each receive element across transmit elements instead of on a per-transmit element basis. That is, a period of a chirp $T_c$, the pulse repetition interval, is also the period of a Doppler sample $T_{sD}$. Because the period $T_c$ is reduced from the duration between pulse trains to the duration of each pulse, the corresponding Doppler sampling frequency $f_{sD}$ is increased (i.e., Doppler sample $T_{sD}$ is decreased) and Doppler ambiguity is reduced by a factor of the number of transmit elements. Ultimately, the reduction in Doppler ambiguity improves the DOA estimate, because the maximum detectable target velocity $v_{max}$ is given by:

$$v_{max} = \pm \frac{c}{4 f_0 T_{s_d}} \qquad [\text{EQ. 1}]$$

In EQ. 1, c is the speed of light and $f_0$ is the carrier frequency of the transmitted signal. As EQ. 1 indicates, $v_{max}$ increases as $T_{sD}$ (i.e., the period $T_c$) decreases. Target speeds above $v_{max}$ are aliased such that they appear as ghost targets at a different velocity than their actual velocity. This affects the associated DOA estimate and, consequently, the location estimate, as well.

In accordance with an exemplary embodiment, FIG. 1 is a block diagram of a radar system 110 to resolve Doppler ambiguity using digital MPRFs. The vehicle 100 shown in FIG. 1 is an automobile 101. The automobile 101 includes a radar system 110 to detect targets 140 that include other vehicles 100 like the truck shown as an exemplary target 140 in FIG. 1. The radar system 110 may be in communication with other sensors 120 of the automobile 101. The other sensors 120 may include one or more cameras, lidar, or any known detection system. The radar system 110 may also communicate with a controller 130 of one or more vehicle systems (e.g., collision avoidance, adaptive cruise control). The exemplary arrangement in FIG. 1 is discussed for explanatory purposes, but the radar system 110 may be located in different parts of the vehicle 100. In addition, sensors external to the vehicle 100 may transmit sensor data to the vehicle 100 or otherwise communicate with the vehicle 100.

The processing of reflections received as a result transmissions by the radar system 110 is done within the radar system 110 or by a controller 130 coupled to the radar system 110. In either case, the processing is performed by processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In the exemplary embodiment, the radar system 110 is a MIMO system with multiple transmit elements 113 and multiple receive elements 115. The transmit elements differ in phase due to factors such as transmit gain, pattern element differences, and geometry. That is, a target 140 at a given angle from the center of the array of receive elements 115 will create a reflection that exhibits a different phase in each receive element 115 such that performing a fast pulse repetition frequency on raw transmit data induces errors into the FFT output. Thus, two embodiments to perform fast digital MPRF processing are detailed. According to one exemplary embodiment, a partial processing approach is used. According to another embodiment, a full processing approach performs fast MPRF after correcting inter-transmitter element phase and amplitude differences. While the full processing approach details one way to estimate and correct for the phase differences, other approaches, such as maximum likelihood estimation, may be used to estimate and thereafter correct for phase differences between reflections due to the different transmit elements 113 according to alternate embodiments.

Figure 2:
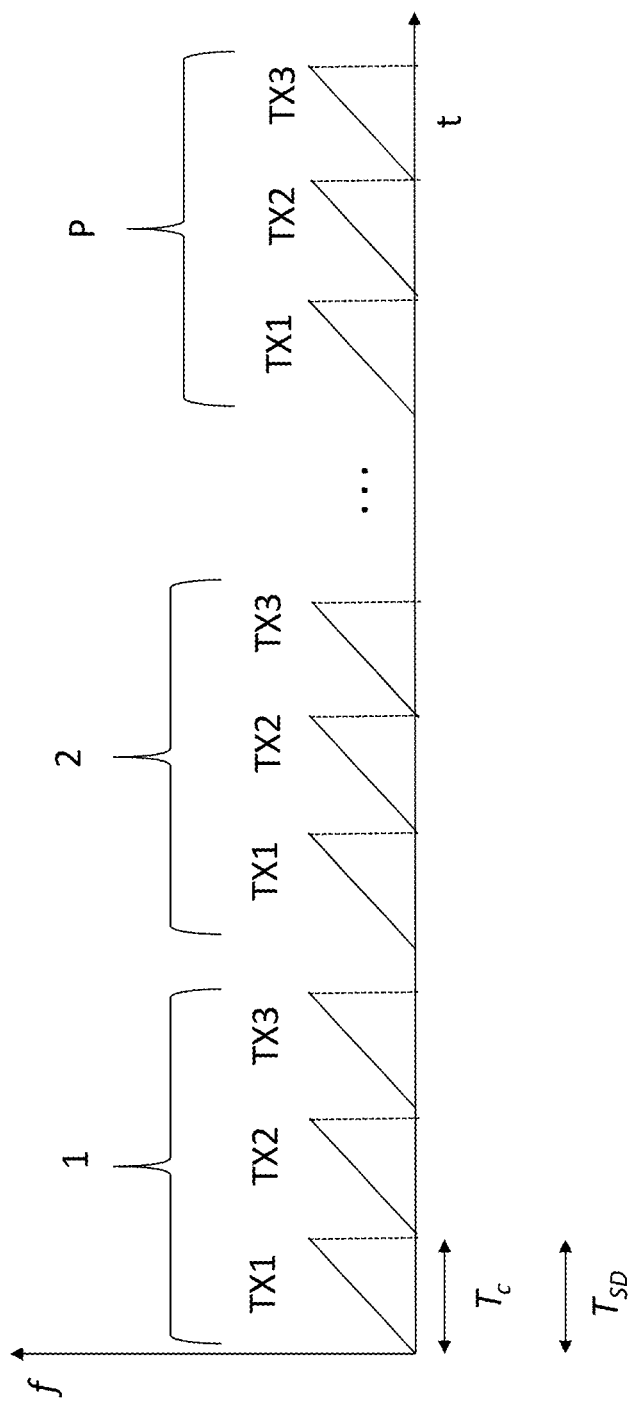
FIG. 2 depicts a set of exemplary transmitted chirps transmitted by a radar system that resolves Doppler ambiguity using digital MPRFs according to one or more embodiments.

FIG. 2 depicts a set of exemplary transmitted chirps TX1, TX2, TX3 transmitted by a radar system 110 that resolves Doppler ambiguity using digital MPRFs according to one or more embodiments. The exemplary radar system 110 includes three transmit elements 113 that respectively transmit chirps TX1, TX2, TX3. The period of a Doppler sample $T_{sD}$ is the same as each chirp period $T_c$ rather than the period of the set of chirps ($3*T_c$). As previously noted, this decrease in the period of a Doppler sample $T_{sD}$ results in an increase in the corresponding Doppler sampling frequency $f_{sD}$ and a reduction in the Doppler ambiguity by a factor of three, the number of transmit elements in the exemplary case.

Figure 3:
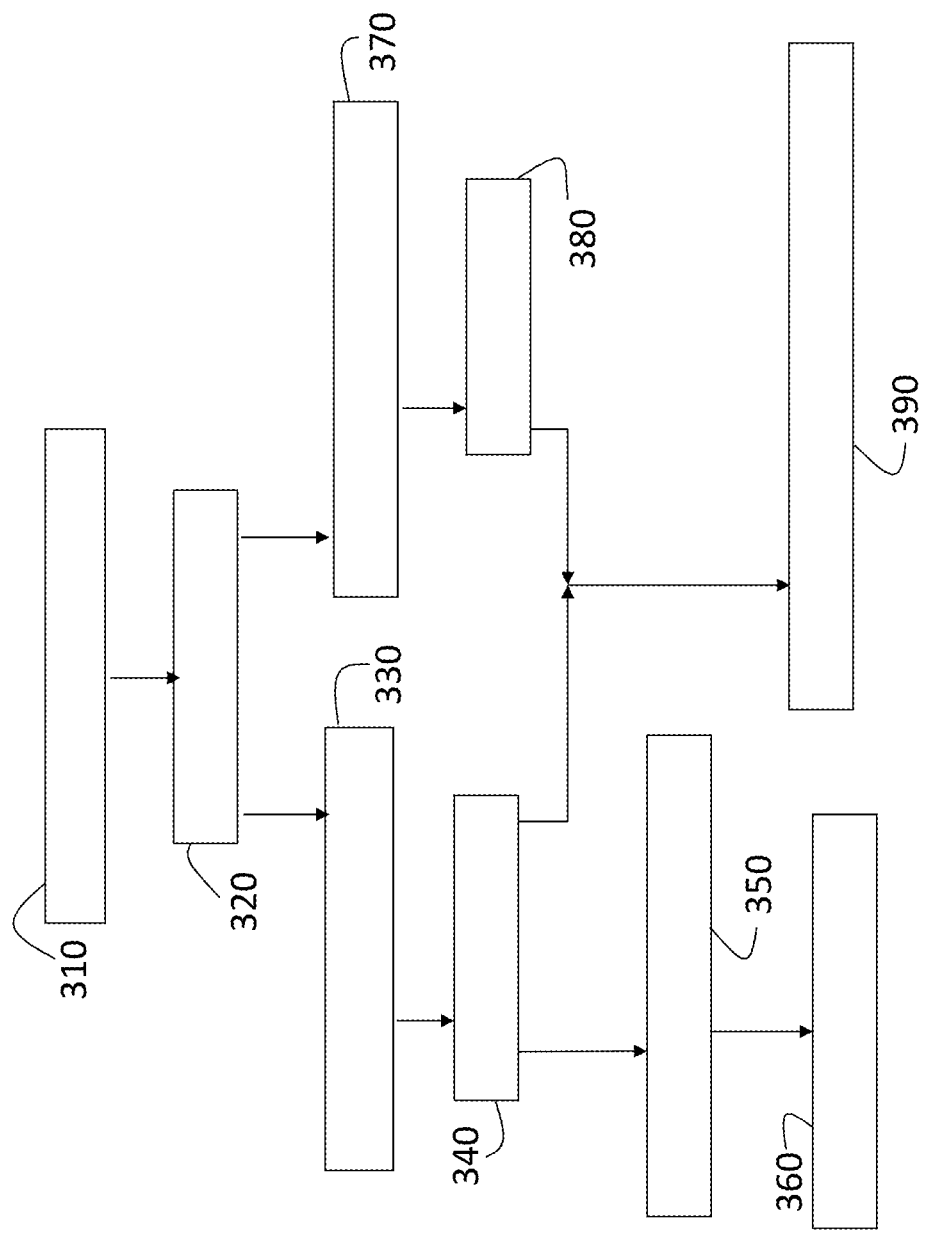
FIG. 3 is a process flow of a method of resolving Doppler ambiguity using digital MPRFs according to one or more embodiments.

FIG. 3 is a process flow of a method of resolving Doppler ambiguity using digital MPRFs according to one or more embodiments. At block 310, obtaining reflections includes obtaining the reflection received at each receive element based on a transmission from each transmit element. At block 320, performing a range FFT is on a per-chirp basis. The range FFT provides an indication of the energy distribution across ranges detectable by the radar at each receive element 115 based on transmission by each of the transmit elements 113. The result of the range FFT is a range-chirp map 410 (FIG. 4) for the combination of each receive element 115 with each transmit element 113 with each element of each range-chirp map 410 being associated with a range bin and a chirp index, referred to as slow time.

Figure 4:
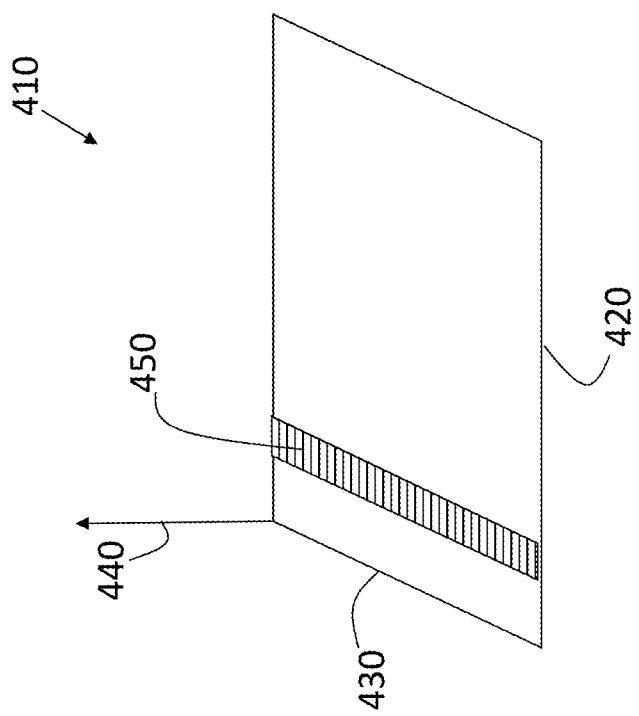
FIG. 4 shows components of a range-chirp map obtained according to a process shown in FIG. 3.

FIG. 4 shows components of a range-chirp map 410 obtained according to the process at block 320. The output of block 320 is a range-chirp map 410 per combination of receive element 115 and transmit element 113. That is, for each receive element 115 and transmit element 113, the energy level resulting from the FFT is shown for each range bin resulting from each chirp. In FIG. 4, axis 420 indicates range bin, axis 430 indicates the chirp index, and axis 440 indicates the energy level. The strip 450 indicates range FFT values for a given range bin and all the chirp indices. There are as many range-chirp maps 410 as combinations of receive elements 115 and transmit elements 113.

Figure 5:
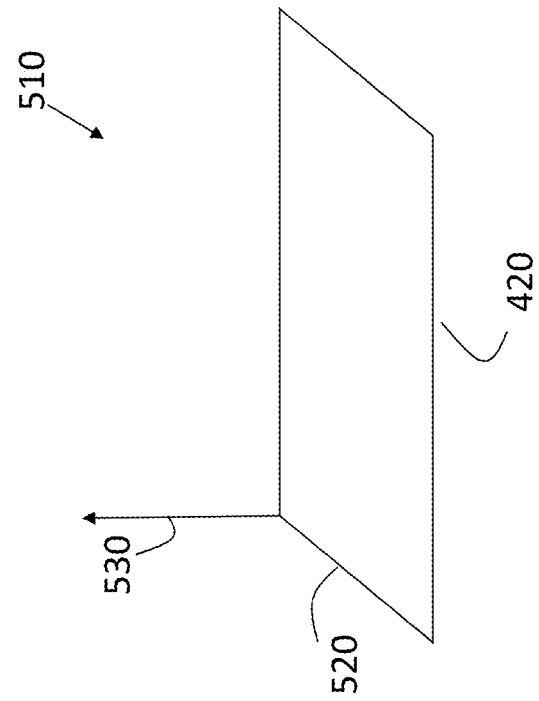
FIG. 5 shows components of a range-Doppler map according to exemplary embodiments.

At block 330, performing the first Doppler FFT includes performing what is also referred to as a slow Doppler FFT. Specifically, an FFT is performed across the chirp indexes associated with each transmit element 113 per range bin (e.g., a portion of the strip 450) to obtain velocity per range in a range-Doppler map 510 (FIG. 5). FIG. 5 shows components of a range-Doppler map 510. Thus, for each receive element 115, there are as many range-Doppler maps 510 as there are transmit elements 113. As FIG. 5 indicates, each range-Doppler map 510 indicates range bin along axis 420, Doppler, which corresponds with relative velocity of the target 140, along axis 520, and energy level along axis 530 when an absolute value of the FFT output is taken.

At block 340, performing detection refers to a set of processes to identify one or more targets 140. Each of the range-Doppler maps 510 associated with a combination of a receive element 115 and a transmit element 113 are summed such that a single range-Doppler map 510 is obtained for all combinations of receive elements 115 and transmit elements 113. A threshold is applied to the single range-Doppler map 510 to ascertain the range bin and Doppler combinations that are associated with energy levels that exceed the threshold. These combinations indicate the range and relative speed of detected targets 140. At block 350, performing Doppler correction refers to a known process of removing the phase accumulation due to target movement. That is, because of the different times at which each of the transmit elements 113 transmits in a TDMA scheme, the target movement in the time lag between transmissions by the different transmit elements 113 results in accumulation of phase.

Performing Doppler correction, at block 350, refers to removing this component of the phase difference in received reflections resulting from each of the transmit elements 113. The phase between the different transmit elements 113 is accumulated due to the time that passes between the transmissions. This phase difference is removed from the complex vector corresponding to each detection through multiplying with a vector containing the conjugate of the accumulated phases. As a result of the processing at block 350, phase differences among reflections resulting from transmissions by each of the transmit elements 113 are due only to the difference in angle from each of transmit elements 113 to a given target 140. The signal resulting from the Doppler correction may be expressed as:

$$r(t)=\cos(2\pi f_0 \tau_0 - 2\pi f_d KT + 2\pi(f_\omega - f_d)t_k) \quad [\text{EQ. 2}]$$

In EQ. 2, $\tau_0$ is the delay to the target, and $2\pi f_0 \tau_0$ is the constant phase term. In addition, $f_d$ is the Doppler frequency offset, K is the chirp index, and T is the pulse interval (i.e., Tc according to embodiments). The third phase element in EQ. 2 represents the result of removing the phase difference between the different transmit elements 113, with $f_\omega$ representing the frequency difference between the transmitted and received signals, which is proportional to the range to the target. Finally, $t_k$ is the differential time offset relative to the start time of the kth chirp.

At block 360, performing beamforming refers to performing a known process of estimating the angle to the target 140 from the center of the array of transmit elements 113. This is also referred to as the DOA. The process involves obtaining a vector of complex scalars by multiplying the vector of received signals by a matrix of radar array responses received at each receive element 115 for each transmit element 113 transmission, for each angle of arrival of interest of a target reflection. An absolute of the vector is taken and a maximum is selected per detected target 140. The angle corresponding to the maximum represents the azimuth and elevation angles to a given detected target 140.

Along the other branch shown in FIG. 3, the processes include performing a second Doppler FFT at block 370. The second Doppler FFT is also referred to as a fast Doppler FFT. Specifically, an FFT is performed across the chirp indexes associated with all transmit elements 113 per range bin (e.g., a full strip 450) to obtain velocity per range in a range-Doppler map 510. Thus, for each receive element 115, there is only one range-Doppler map 510. This is in contrast to the result of the slow FFT (at block 330) which is a range-Doppler map 510 for each receive element 115 and each transmit element 113. Obtaining a sum, at block 380, refers to summing the range-Doppler maps 510 for all the receive elements 115.

As FIG. 3 indicates, the single range-Doppler map 510 obtained as a result of the summing, at block 380, is provided to the processing at block 390. As also indicated by FIG. 3, the threshold-applied single range-Doppler map 510 for all the receive elements 115 obtained as part of the processing at block 340 is additionally provided to the processing at block 390. At block 390, comparing and selecting among hypotheses refers to determining the unambiguous Doppler (relative velocity) of each target 140 detected at block 340. The hypotheses are explained with reference to FIG. 6.

Figure 6:
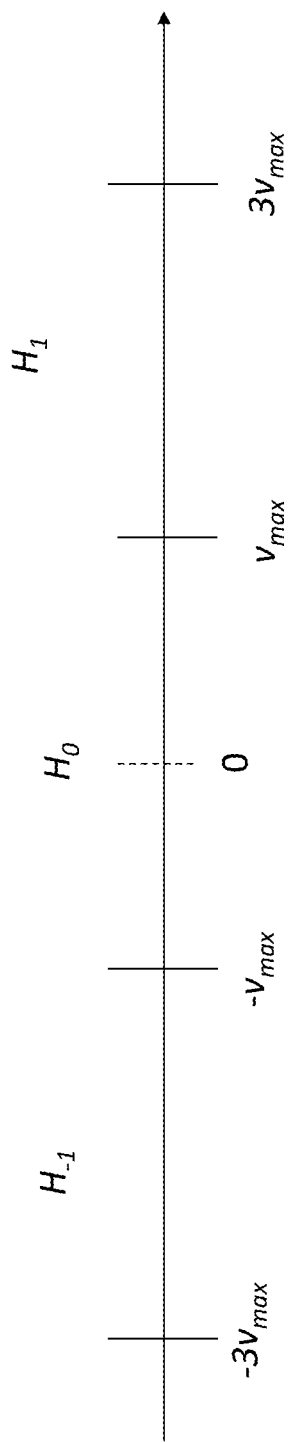
FIG. 6 illustrates three exemplary hypothesis categories according to an exemplary embodiment.

FIG. 6 illustrates three exemplary hypothesis categories $H_0$, $H_1$, $H_{-1}$ according to an exemplary embodiment. The hypothesis categories $H_0$, $H_1$, $H_{-1}$ refer to the three ranges of relative velocity values shown in FIG. 6. The Doppler spread (set of relative velocity values) of the range-Doppler map 510 obtained from block 380 is broader than the Doppler spread of the range-Doppler map 510 obtained from block 340. This is because the second Doppler FFT process, at block 370, considered all the chirps transmitted by all the transmit elements 113 in a single range-Doppler map 510 for each receive element 115. As a result, energy levels are indicated in all three hypothesis categories $H_0$, $H_1$, $H_{-1}$ in the range-Doppler map 510 obtained from block 380 while energy levels are only indicated in hypothesis category $H_0$ in the range-Doppler map 510 obtained from block 340.

Because the input from block 340 indicates the energy levels that exceed the detection threshold, the range-Doppler map 510 obtained from block 340 indicates the range and relative velocity (in hypothesis category $H_0$) of all detected targets 140. These range and relative velocity combinations associated with targets 140 are examined in the range-Doppler map 510 obtained from block 380. If the target 140 relative velocity indicated by the range-Doppler map 510 obtained from block 380 is also in hypothesis category $H_0$, then the relative velocity determined according to the processing at block 340 is determined to be unambiguous relative velocity of the target 140. On the other hand, if the relative velocity indicated by the range-Doppler map 510 obtained from block 380 (for the same target 140) is in one of the other hypothesis categories $H_1$, $H_{-1}$, then the relative velocity indicated by the range-Doppler map 510 obtained from block 340 is determined to be ambiguous, and the relative velocity is instead determined based on the range-Doppler map 510 obtained from block 380. The complete set of outputs that are ultimately obtained from the processes shown in FIG. 3 are range, Doppler, azimuth, elevation, and amplitude for each detected target 140.

FIG. 7 is a process flow of a method of resolving Doppler ambiguity using digital MPRFs according to alternate one or more embodiments. According to the embodiment shown in FIG. 7, a second Doppler FFT process (at block 370) is performed for each of the three hypotheses categories $H_0$, $H_1$, $H_{-1}$, respectively, as detailed. The processes already discussed with reference to FIG. 3 will not be detailed again. As FIG. 7 indicates, the right-most branch of processes, those including processes at blocks 310 through 360, are the same as the left-most branch of processes shown in FIG. 3. The DOA obtained by performing beamforming, at block 360, is associated with hypothesis category $H_0$. After the DOA is determined by performing beamforming, at block 360, a new process is performed, at block 710, of correcting DOA. This process of correcting DOA, at block 710, is also reached in the two other branches. In the other two branches shown in FIG. 7, the result of performing the first Doppler FFT, at block 330, is used as an input to performing Doppler correction, at block 350.

As previously noted, performing the first Doppler FFT, at block 330, results in a matrix indicating velocity per range in each range-Doppler map 510 associated with each transmit element 113 and receive element 115 combination. Performing Doppler correction, at block 350, includes removing the component of the phase difference in received reflections resulting from each of the transmit elements 113. According to the present embodiment, the Doppler correction at each of the three branches assumes a target velocity within a different one of the hypothesis categories $H_0$, $H_1$, $H_{-1}$. That is, the middle and left-most branches respectively are associated with hypothesis categories $H_1$ and $H_{-1}$.

Performing beamforming, at block 360, refers to the process of obtaining the DOA as previously discussed. The DOA estimated at each of the three branches is based on a different hypothesis for the target velocity. Thus the DOA obtained at each of the three branches is different. Correcting the DOA, at block 710, refers to removing the phase difference among the transmit elements 113 due to geometry. Specifically, a vector of relative phases is computed based on the DOA and the range FFT output (at block 320) is multiplied by the inverse of the relative phases across the transmit elements 113. At block 370, performing the second Doppler FFT is similar to the process described with reference to FIG. 3. However, according to the present embodiment, the range-Doppler map 510 generated for each receive element 115 at the leftmost and middle branches is based on performing an FFT associated with velocities in the hypothesis categories $H_1$ and $H_{-1}$, and the second Doppler FFT performed, at block 370, in the rightmost branch is associated with hypothesis category $H_0$.

At block 720, summing across the receive elements 115 refers to summing the range-Doppler maps 510 obtained for each of the receive elements 115 at each of the three branches. At block 730, comparing and choosing a hypothesis refers to comparing the result of performing detection, at block 340, with the result of the summing, at block 720, to determine which velocity and corresponding hypothesis category $H_0$, $H_1$, or $H_{-1}$ is the closest match with the detection. The process at block 730 may be repeated for each detected target 140, at block 340, if more than one target 140 is detected. As previously discussed with reference to block 390, the comparing and choosing, at block 730, determines the unambiguous Doppler or relative velocity of each detected target 140.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of detecting a target with a radar system of a vehicle, the method comprising:
    transmitting two or more chirps, in turn, from two or more transmit elements, wherein each chirp is a continuous wave linear frequency modulated waveform;
    receiving reflections generated by each of the two or more chirps from each of the two or more transmit elements at two or more receive elements; and
    processing the reflections based on performing a Doppler fast Fourier transform (FFT) corresponding with each of the two or more chirps, each Doppler FFT using a Doppler sampling frequency corresponding with a period of each of the two or more chirps to determine velocity of each detected target relative to the vehicle, wherein the processing the reflections includes performing a range FFT to obtain a range-chirp map as a matrix of FFT results for each range bin and each chirp for every combination of the two or more transmit elements and the two or more receive elements, the processing the reflections further includes performing the Doppler FFT on the range-chirp maps to obtain a range-Doppler map as a matrix of FFT results for each range bin and each Doppler bin for every combination of the two or more transmit elements and the two or more receive elements, and the processing the reflections also includes performing two beamforming processes to determine corresponding directions of arrival of each target, each of the two beamforming processes being associated with a different range of target velocities.

2. The method according to claim 1, wherein the processing the reflections further includes performing target detection using the range-Doppler maps.

3. The method according to claim 2, wherein the processing the reflections further includes comparing a result of the performing the target detection with a result of performing a second Doppler FFT on the range-chirp maps, wherein the performing the second Doppler FFT involves obtaining FFT results for each range bin and each Doppler bin associated with all of the two or more transmit elements for each of the two or more receive elements.

4. The method according to claim 3, wherein the comparing is used to resolve ambiguity in the velocity of each detected target relative to the vehicle.

5. The method according to claim 2, wherein the processing the reflections further includes comparing a result of the performing the target detection with results of performing two second Doppler FFT processes on the range-chirp-maps, wherein the performing each of the second Doppler FFT processes involves obtaining FFT results for each range bin and each Doppler bin associated with all of the two or more transmit elements for each of the two or more receive elements.

6. The method according to claim 5, wherein the performing the two second Doppler FFT processes is associated with two different ranges of target velocities, and the comparing is used to resolve ambiguity in the velocity of each detected target relative to the vehicle.

7. The method according to claim 1, wherein the processing, the reflections further includes correcting the directions of arrival to remove relative phase differences among the two or more transmit elements.

8. A system to detect a target with a radar system of a vehicle, the system comprising:
    two or more transmit elements configured to transmit two or more chirps, in turn, wherein each chirp is a continuous wave linear frequency modulated waveform;
    two or more receive elements configured to receive reflections generated by each of the two or more chirps from each of the two or more transmit elements; and
    a processor configured to process the reflections based on performing a Doppler fast Fourier transform (FFT) corresponding with each of the two or more chirps, each Doppler FFT using a Doppler sampling frequency corresponding with a period of each of the two or more chirps to determine velocity of each detected target relative to the vehicle, wherein the processor is further configured to perform a range FFT to obtain a range-chirp map as a matrix of FFT results for each range bin and each chirp for every combination of the two or more transmit elements and the two or more receive elements, the processor is further configured to perform the Doppler FFT on the range-chirp maps to obtain a range-Doppler map as a matrix of FFT results for each range bin and each Doppler bin for every combination of the two or more transmit elements and the two or more receive elements, and the processor is also configured to perform two beamforming processes to determine corresponding directions of arrival of each target, each of the two beamforming processes being associated with a different range of target velocities.

9. The system according to claim 8, wherein the processor is further configured to perform target detection using the range-Doppler maps.

10. The system according to claim 9, wherein the processor is further configured to obtain a comparison of a result of performing the target detection with a result of performing a second Doppler FFT on the range-chirp maps, wherein the performing the second Doppler FFT involves obtaining FFT results for each range bin and each Doppler bin associated with all of the two or more transmit elements for each of the two or more receive elements.

11. The system according to claim 10, wherein the processor is further configured to use a result of the comparison to resolve ambiguity in the velocity of each detected target relative to the vehicle.

12. The system according to claim 9, wherein the processor is further configured to obtain a comparison of a result of the performing the target detection with results of performing two second Doppler FFT processes on the range-chirp-maps, wherein the performing each of the second Doppler FFT processes involves obtaining FFT results for each range bin and each Doppler bin associated with all of the two or more transmit elements for each of the two or more receive elements.

13. The system according to claim 12, wherein the performing the two second Doppler FFT processes is associated with two different ranges of target velocities, and the processor is further configured to use a result of the comparison to resolve ambiguity in the velocity of each detected target relative to the vehicle.

14. The system according to claim 8, wherein the processor is further configured to correct the directions of arrival to remove relative phase differences among the two or more transmit elements.

* * * * *